US009665599B2

(12) United States Patent
Lee et al.

(10) Patent No.: US 9,665,599 B2
(45) Date of Patent: May 30, 2017

(54) MAINTAINING DATABASE CONSISTENCY WHEN NEARING THE END OF A DATABASE RECOVERY LOG

(71) Applicant: International Business Machines Corporation, Armonk, NY (US)

(72) Inventors: Stephanie H. Lee, Saratoga, CA (US); David L. Levish, San Jose, CA (US); David W. Slinger, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 13/908,396

(22) Filed: Jun. 3, 2013

(65) Prior Publication Data

US 2014/0358878 A1  Dec. 4, 2014

(51) Int. Cl.
G06F 7/00  (2006.01)
G06F 17/30  (2006.01)

(52) U.S. Cl.
CPC .. G06F 17/30286 (2013.01); G06F 17/30368 (2013.01)

(58) Field of Classification Search
None
See application file for complete search history.

(56) References Cited

U.S. PATENT DOCUMENTS

| | | | |
|---|---|---|---|
| 7,284,153 B2 | 10/2007 | Okbay | |
| 7,783,666 B1 * | 8/2010 | Zhuge | G06F 17/30082 707/783 |
| 7,925,856 B1 | 4/2011 | Greene | |
| 8,099,398 B2 | 1/2012 | Shimizu | |
| 8,131,784 B1 * | 3/2012 | Zhuge | G06F 17/30073 707/823 |
| 8,924,364 B1 * | 12/2014 | Zhong | G06F 17/30303 707/690 |
| 2002/0147733 A1 * | 10/2002 | Gold | G06F 11/1464 |
| 2003/0120669 A1 * | 6/2003 | Han | G06F 11/1666 |
| 2007/0088737 A1 | 4/2007 | Kawakami | |
| 2008/0052331 A1 * | 2/2008 | Ogawa | G06F 3/0605 |
| 2008/0086561 A1 | 4/2008 | Dang | |
| 2009/0287878 A1 * | 11/2009 | Yamamoto | G06F 3/0616 711/103 |
| 2010/0210240 A1 * | 8/2010 | Mahaffey | H04L 41/0253 455/411 |
| 2013/0080408 A1 * | 3/2013 | Cashman | G06F 3/0608 707/692 |

FOREIGN PATENT DOCUMENTS

JP  2006301891  2/2006
JP  2007200114  8/2007

\* cited by examiner

*Primary Examiner* — Thu Nga Nguyen
(74) *Attorney, Agent, or Firm* — Anthony V. S. England; Mohammed Kashef (57) ABSTRACT

Log records are generated by a computer system and stored in a computer readable storage area for recording changes to database objects responsive to receiving transaction requests, wherein the locators for the log records are of a predetermined maximum size that provides a maximum trackable size limit of the storage area. A computer system estimates an amount of time for the storing of the generated log records to fill the storage area up to the maximum trackable size limit. A computer system sets a soft limit to the storage area that is smaller than the maximum trackable size limit, including setting the soft limit based on the estimated amount of time.

18 Claims, 5 Drawing Sheets

MAINTAINING DATABASE CONSISTENCY WHEN NEARING THE END OF A DATABASE RECOVERY LOG

BACKGROUND

Databases have data structures such as rows, pages, blocks, tables, and others, which will be referred to herein generally as "objects." A database manager, i.e., an executing computer program, handles a database application's requests to store or retrieve data as well as processing the database application's requests to commit or abort the changes done since the last point of consistency. The database manager may create log records to track respective changes made by a database application to such objects by creating log records. The database manager may store a data structure (referred to herein as a "locator") that points to the log record containing the most recent change for an object.

SUMMARY

According to an embodiment of the invention, a method for database transaction logging includes generating log records by a computer system and storing them in a computer readable storage area for recording changes to database objects responsive to receiving transaction requests, wherein the locators for the log records are of a predetermined maximum size that provides a maximum trackable size limit of the storage area. Further, the method includes estimating, by a computer system, an amount of time for the storing of the generated log records to fill the storage area up to the maximum trackable size limit; and setting, by a computer system, a soft limit to the storage area that is smaller than the maximum trackable size limit, including setting the soft limit based on the estimated amount of time.

Other embodiments of the invention are disclosed and claimed, including implementations in a computer system and a program product.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
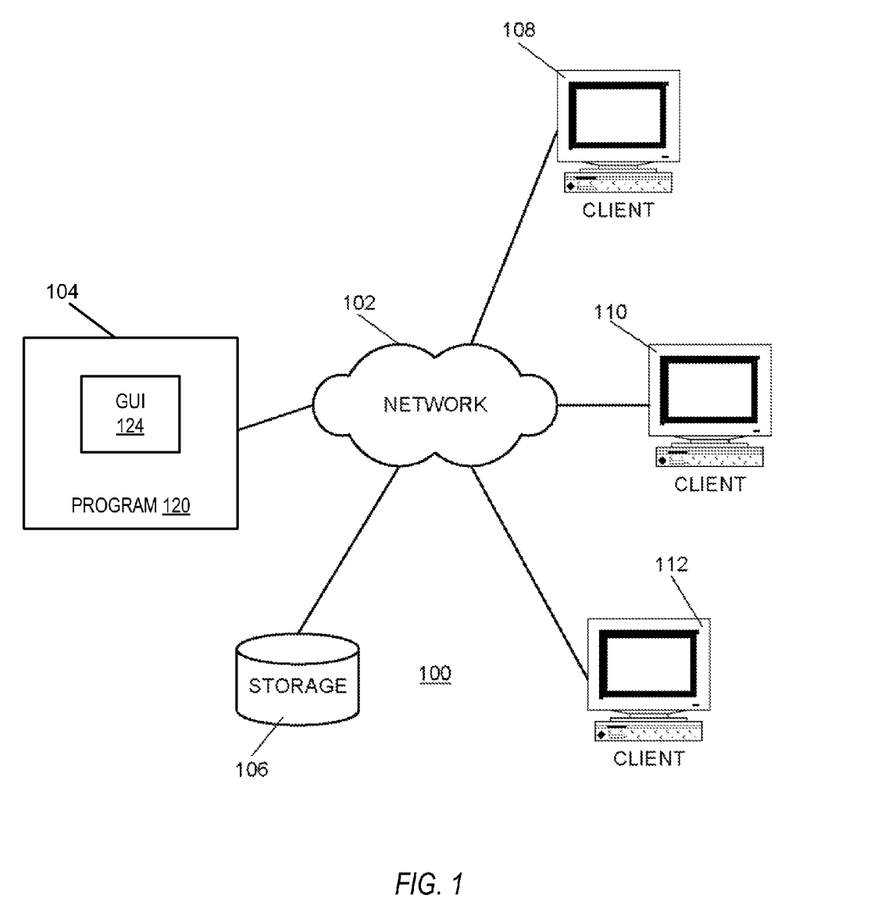
FIG. 1 is an exemplary block diagram illustrating a distributed data processing system according to embodiments of the invention.
Figure 2:
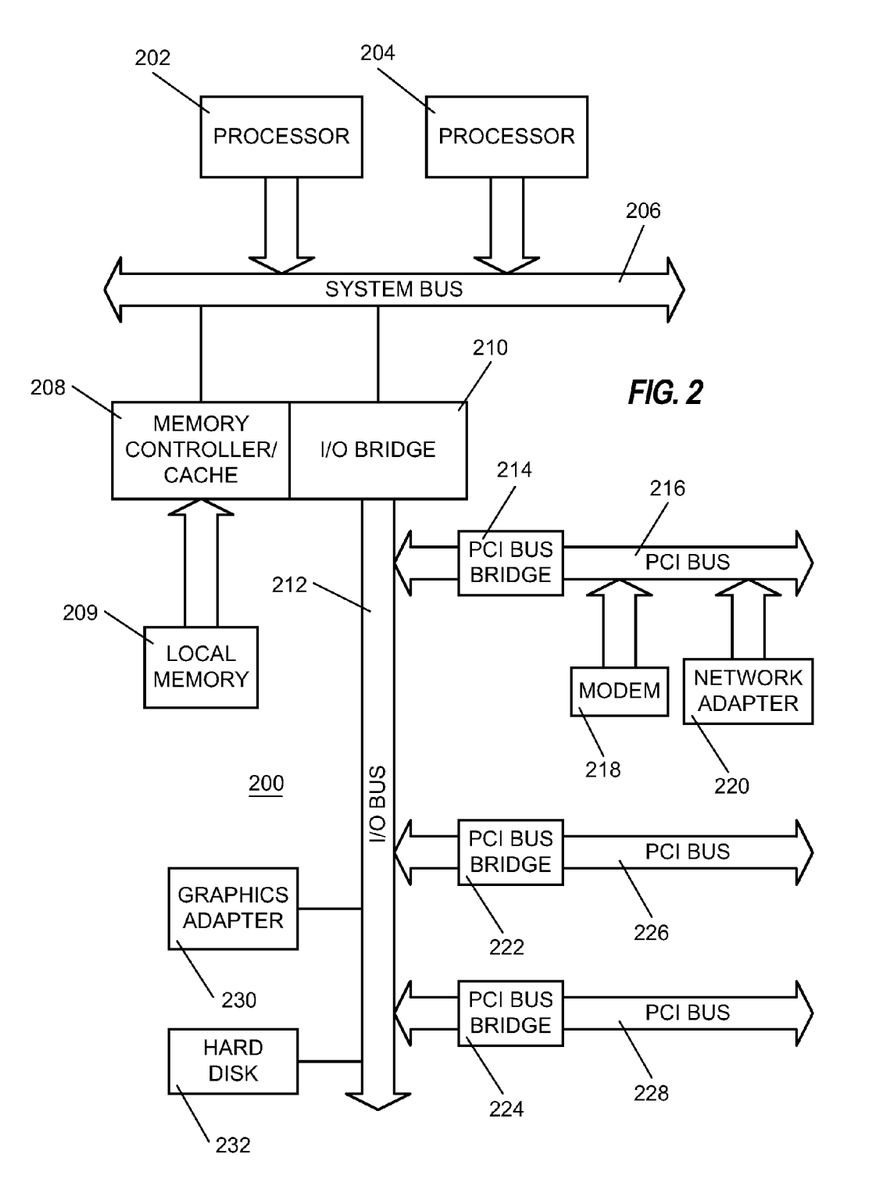
FIG. 2 is an exemplary block diagram of a server apparatus according to embodiments of the invention.
Figure 3:
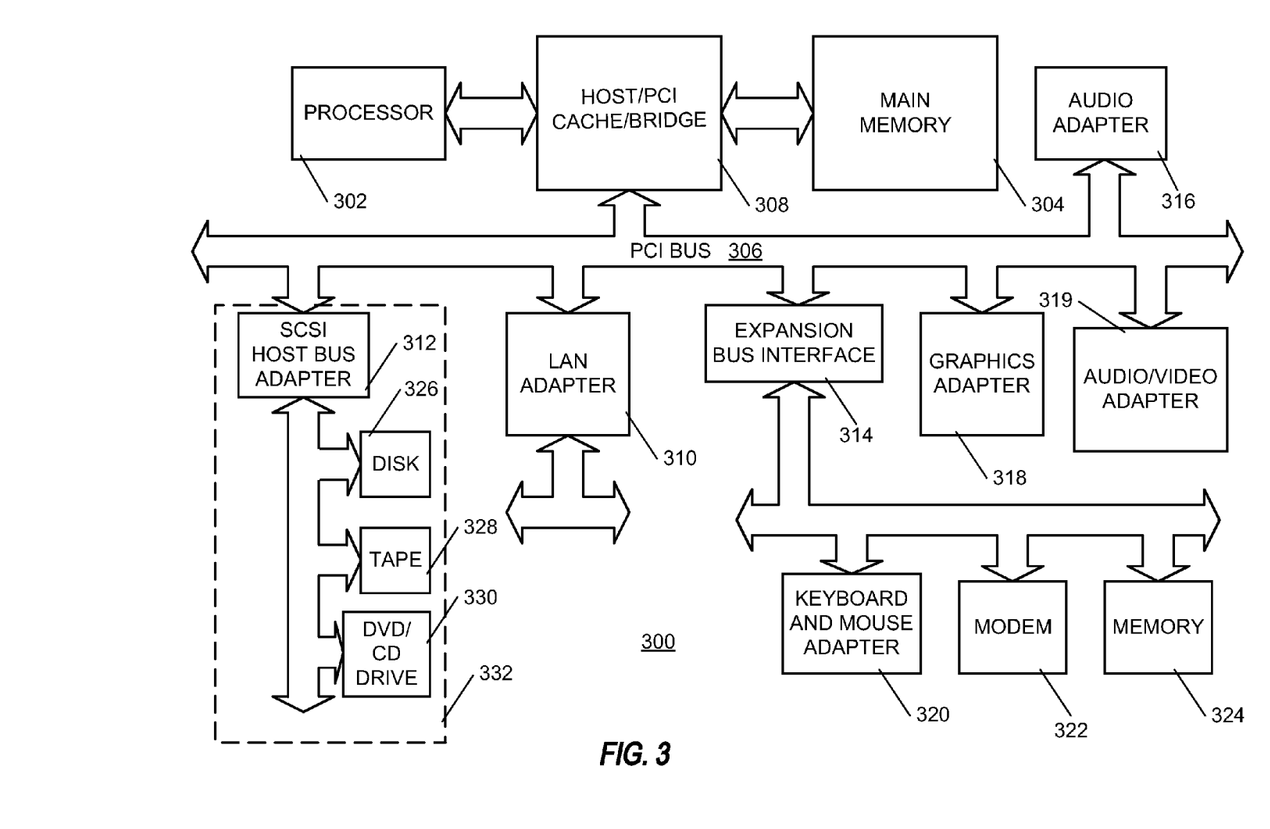
FIG. 3 is an exemplary block diagram of a client apparatus according to embodiments of the invention.

As previously noted, FIGS. 1-3 are, respectively, an exemplary block diagram illustrating a distributed data processing system, an exemplary block diagram of a server apparatus, and an exemplary block diagram of a client apparatus, all according to embodiments of the invention. Details of FIGS. 1-3 will be described after FIGS. 4 and 5 are described in detail.

Figure 4:
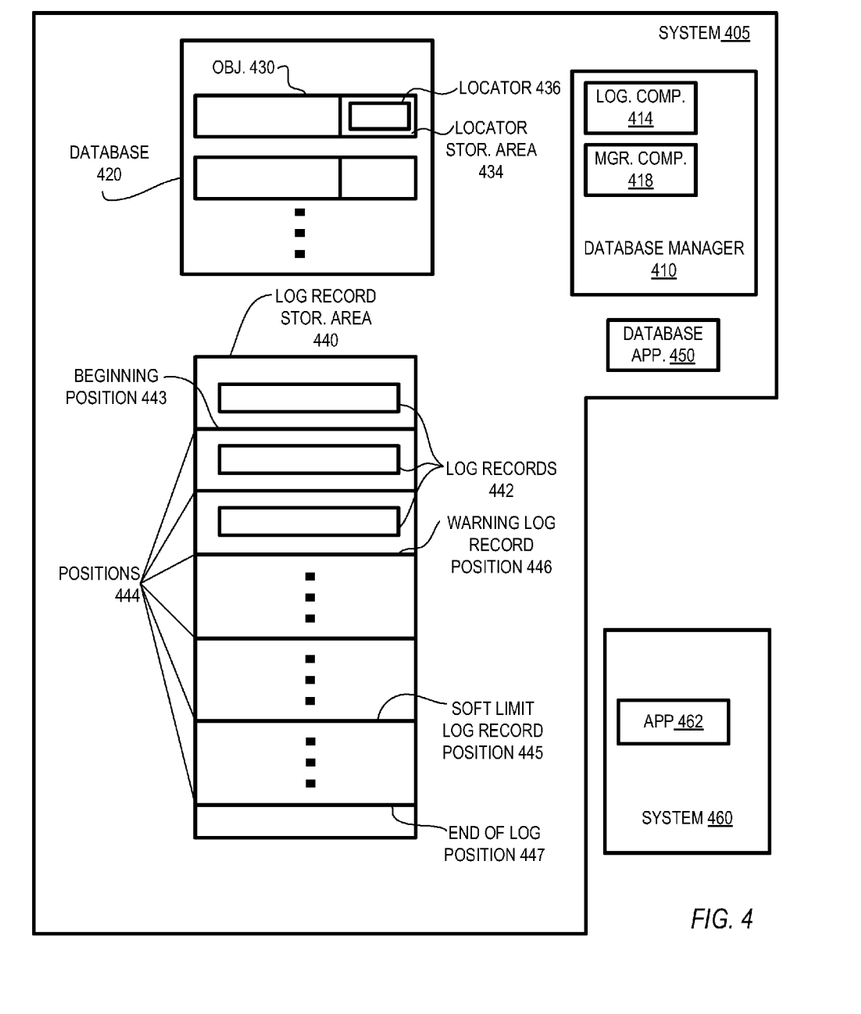
FIG. 4 illustrates structure of data and instructions, according to embodiments of the present invention.
Figure 5:
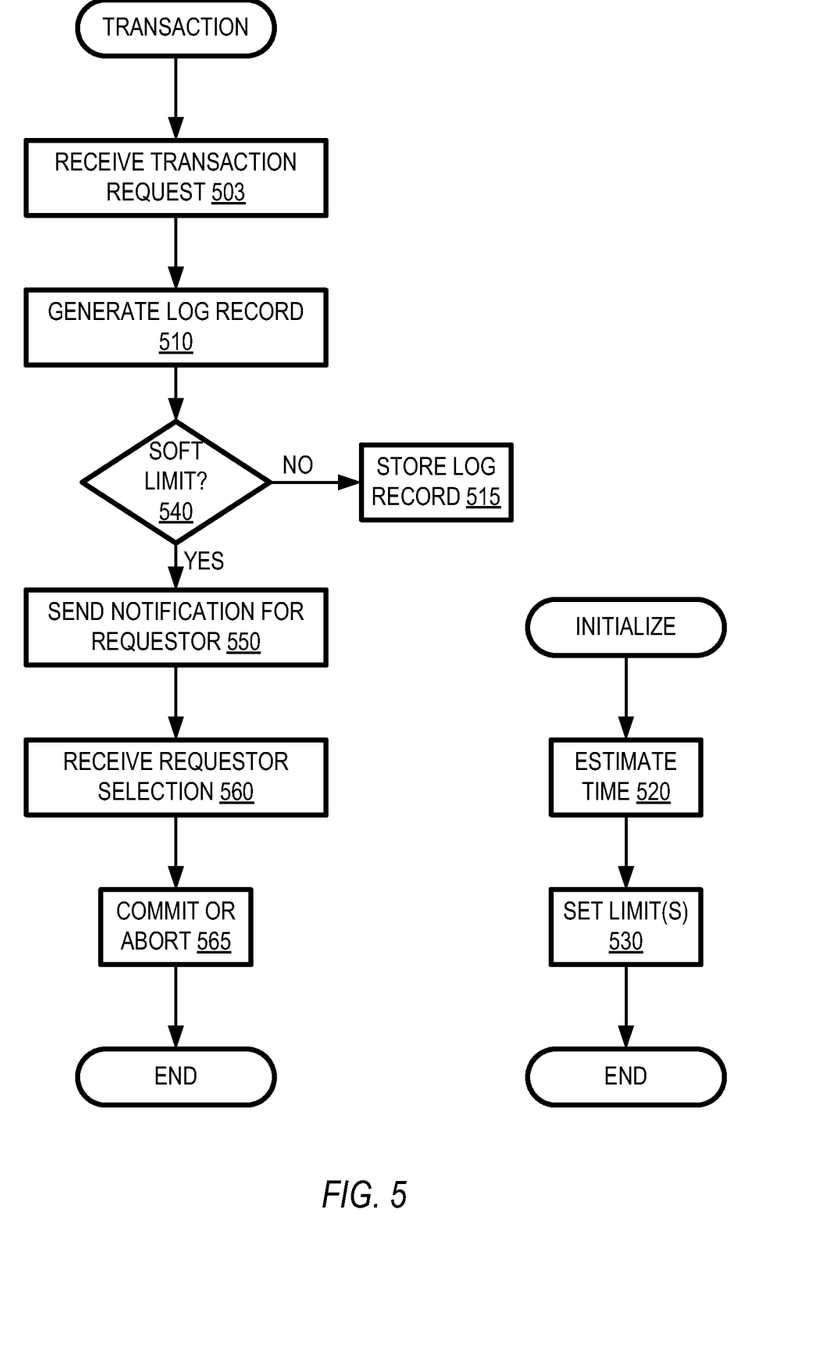
FIG. 5 illustrates a method for database transaction logging, according to embodiments of the present invention.

Referring now to FIG. 4, which illustrates structure of data and instructions according to embodiments of the present invention, wherein a database manager 410 may create log records 442 to track respective changes made by database application 450 to objects 430 in a database 420 by creating log records 442. Herein, a "change" includes a simple update to a single object 430, such as a database row. A transaction includes a set of one or more changes that are committed together. For each transaction for each object 430 there is a corresponding log record 442 or set of log records 442. The changes to an object 430 occur over time, so that the changes are in a sequence, as are the corresponding log records. The sequential position of a change in its change sequence may be referred to as the change's "level," so that a log record 442 for the most recent change of objects 430 may be said to track the object's current level.

A locator 436 may be stored as metadata for an object 430, which may be adjacent to the object 430, nearby or somewhere else. For instance, object 430 may be rows, where database 420 may have blocks on a storage device such as a disk, where each block may contain multiple row objects 430, as shown in FIG. 4. Database manager 410 may track the last change to each row object 430, which may include storing a locator 436 for the log record 442 for the last change of each row object 430 as metadata at a prefix or suffix of the row object 430, i.e., physically adjacent to the row object 430. Or manager 410 may track the most recently changed row object 430 in a block, which may include storing the locator 436 as a suffix or prefix of the block, which is logically adjacent, in a sense, and is physically nearby the row object 430. Or the manager 410 may track changes to a row object 430 or other such object 430 by storing a locator 436 for its most recent change in a directory on the disk that is different than that of the object 430, for example, i.e., neither physically nor logically adjacent. (Often, the second option is used as a compromise between space efficiency, performance and concurrency.) Locator 436 may define a location value that points to the location, i.e., position 444, of the log record 442 via a relative byte address, which is a physical address such as a byte address relative to the beginning of a log record storage area 434. Or locator 436 may define a location value via a sequence number or some other time-derived value.

There may be many log records created for a transaction, or very few. Here is an example of four log records for a very simple transaction:

Begin transaction

Update a database row. This contains the old data, the new data and any changed metadata.

Commit transaction

End transaction

In a simplified database 420, all the log records 442 in the above example may be combined into one log record. Typically, that is not done because there can be many "update a database row" log records.

Log records 442 are typically never removed. For example, if a change is undone, a log record 442 is usually written for the change, as well as the log record 442 for the original change. A restart is one exception for which log records 442 may be removed and is described herein below.

Typically the size of the area 434 that stores log record locators 436 is fixed, which limits the maximum number and size of log record locators 436. When this limit is reached, no further updates can be done while still guaranteeing transactional consistency. This situation has typically been handled by a database manager program causing a restart of a database application from the very beginning location in a log record storage area. This restart typically has included the manager causing the data base application to start over by removing previously created log record locators and either physically removing previous log records or else logically removing them by taking steps including resetting the end-of-file position for the collection of log records. For example, the collection may be a file and resetting may truncate the file to length 0. Then log records may start re-writing from the beginning when new ones are created. Often this has been required with little or no previous warning, which may result in partially completed transactions being in a database. The hard limit is often encountered in a database manager and results in a crash, which is preferable to a wraparound. This can cause transactions to be incomplete and the database to be logically inconsistent with no means of rectifying the damage. The hard limit applies to all database objects, regardless of importance.

The simplest thing to do is to terminate the database manager 410 when the end of the log range is detected, so the only limit is a hard limit. This is how many database managers react. It is known, however, to issue warnings to a database or system administrator as an end of log range approaches and to terminate if the end is reached, which is to prevent "wraparound." Specifically, it is known to do this by setting an arbitrary constant that is loosely considered close enough to the end of the range such that something needs to be done. For example, where a maximum log RBA locator value is hexadecimal FFFFFFFFFFFF, it is known to generate a warning message at hexadecimal F00000000000, i.e., when 1/16 of the log range remains and to terminate as soon as possible after hexadecimal FFFF00000000 is reached, i.e., when 1/65536 of the range is remains.

Herein, the end 447 of the log range 440 that is supported by the locator storage area 434 (such as may be indicated by relative byte address, time, or sequence number) is referred to as a "hard limit," represented by a locator 436 hard limit value, because the locator storage area 434 does not have physical space to support locators for tracking additional log records 442 past this log range 440 limit 447. According to embodiments of the present invention, as database 420 transactions occur over time and the locator 436 hard limit value approaches, a database logging component 414 of database manager 410 takes actions in order to practically eliminate the possibility of database transactions being incomplete when the log range 440 finally fills up and encounters its locator 436 supported ending location 447.

Specifically, logging component 414 provides a "soft limit," according to embodiments of the present invention, which may include component 414 calculating a locator 436 soft limit value, which it sets in order to indicate a corresponding location 445 for a log record 442 in area 440. Upon a transaction hitting soft limit value, component 414 prevents the transaction and future transactions from making further updates, but permits database application 450 to select to commit any transaction that is already able to be committed, which completes such a transaction, including one or more updates. In addition, after manager 410 encounters the soft limit, component 414 permits database application 450 to select alternatively aborting a transaction, which undoes its change or changes. Alternatively, manager 410 may be configured to automatically select whether to commit or abort transactions after the soft limit has been reached. Also, manager application 410 enables updates of critical metadata, i.e., log record locator, updates, i.e., enables those updates that are needed to maintain consistency.

Still more specifically, database logging component 414 continuously monitors the current position 444 within log range 440, as indicated by a locator 436 current value for a currently created log record 442. The position is also checked during restart of manager 410. When the locator 436 current value reaches the soft limit value, logging component 414 responsively sets a soft limit indicator. That is, a manager 410 component 418 responsible for database updates, typically a data manager, index manager or buffer manager, receives a transaction request from a requestor. (Typically, manager 410 runs on one computer system 405 serving a number of users and the request originate from a user via an application 462 running on the user's computer system 460. However, manager 410 may also run on a user's computer system 460.) If component 418 passes the request along to logging component 414, then component 414 responsively generates a new log record 442 and, correspondingly, a new locator 436, as previously explained. If the monitoring detects that the new locator 436 current value exceeds the soft limit value, logging component 414 responsively sets the soft limit indicator, which limits updates as has been described.

The locator 436 current value indicating log record current position 444 is also checked during restart of manager 410. This is done to prevent transactions from starting too close to the end of the log 447, since applications that run nearly continuously will often wait for a database manager such as manager 410 to become active and will then immediately send pending updates that they have buffered.

In addition to setting the soft limit indicator to limit updates when soft limit log record position 445 is reached, component 414 sets a warning limit value for a corresponding warning location 446 for a log record 442 in area 440 and generates warning messages based on the warning limit value, according to embodiments of the present invention. In various embodiments, manager 410 may send the warning messages to an administrator or users.

Setting the appropriate soft and warning limit values for locators 436 depends on the maximum value supported by locators 436 for the corresponding end of log position 447, which is a limiting factor. For example, a default maximum may be September, 2042, due to hardware clock definition, although this may vary and certain system or user actions may change the effective maximum value. From the maximum value and the sampling of current log record position 444 values it can be determined how much time remains before hitting the end of a time-based log range 447, regardless of how many database managers 410 share data 420. It does not matter how many log records 442 are written during the sample time intervals, this position 444 measure always determines the rate at which the end of range 447 approaches, because the current position 444 reflects the overall size of the collection of all existing records 442 by indicating relative location of the current record 442 within storage area 440, not merely how many records there are. This dynamic measure thus facilitates setting soft limits based on how much warning the actual consumption rate indicates is needed to deal with the approaching end of range.

If the locator 436 value for the log record end position 447 is based on time, as is frequently the case when data is shared between multiple database instances (i.e., shared instead of replicated), then limits may be set based on desired amounts of time between the end of log position 447 and the soft and warning log record positions 445 and 446. In one embodiment, locator 436 warning limit value is set for one year before the end of log position 447 and the locator 436 values for the soft limit log record position 445 is set for two weeks before the end of log position 447. As previously mentioned, component 414 sets these locator 436 limit values for corresponding log record positions 445 and 446. In embodiments of the present invention, component 414 does so by calculations based on received input, such as the two week and one year limits just mentioned, which may include values hard-coded in manager 410 or supplied to manager 410 via one or more data structures, such as in one or more initialization file or via user input, such as during restart or via a dynamic update.

To calculate limit values for locators 436 that indicate predetermined limits 445 and 446 to log record storage area 440 based on time, component 414 may, according to embodiments of the present invention, repeatedly determine logging rates, i.e., storage area 440 consumption rates, by repeated observations and calculations. This way, variations in logging rate by time of day, day of the week, etc. are taken into account and component 414 may set stable limit values, since changing the limits often would adversely result in variable behavior, as viewed by database manager 410 transactions.

For example, in one or more embodiments of the present invention, component 414 records changes in the current log record position 444 at sampling intervals determined by one or more timers and divides each change by the time duration of its sampling interval. This indicates a storage area 440 consumption rate for each sample interval. By repeating the sampling and calculations in this manner and combining results, this helps deal with variation in workload. For example, in one or more embodiments of the present invention, each calculated (i.e., observed) consumption rate is simply averaged with the others. Further, for still more precision, a weighted average may be determined. For example, component 414 may categorize the sampling intervals by criteria such as time of day, day of the week, etc. and perform regression analysis to determine coefficients to apply for combining the observed consumption rates according to their categories.

Once it determines a long term consumption rate based on repeated observations and calculations of consumption rate, component 414 calculates the difference between the end of the log record range 447 and the log record position 444 at the end of the sampling interval for the last observation. This indicates the remaining amount of log record storage area 440 at the time of the last data sample. Then, component 414 calculates the approximate amount of time remaining to the end of range 447 by dividing the remaining amount of area 440 by the long term consumption rate. Based on this, component 414 calculates a soft limit log record position 445 that is a specified position prior to end of range 447, such as two weeks. For example, if component 414 determines that the long term logging rate will consume the currently remaining log record storage area 440 in 200 weeks and a soft limit is specified that provides two weeks logging prior to the end of range 447, then component 414 sets a soft limit locator value for a log record position 445 that is a distance of $1/100$ of the currently remaining log record storage area 440 prior to the position at end of range 447. Likewise, in such a case if a warning limit is specified that provides 50 weeks logging prior to the end of range 447, then component 414 sets a warning limit locator value for a log record position 445 that is a distance of $1/4$ of the currently remaining log record storage area 440 prior to the position at end of range 447.

More than one soft limit may be calculated. There might be different limits for different database objects depending on importance or similar criteria. There might be different limits for different applications. For example, account transfers are still allowed when change-of-address updates are stopped, and so on.

Alternatively, rather than determining a single amount of time remaining to the end of range 447 using a single, long term consumption rate as described above, component 414 may determine amounts of time remaining each time it determines a consumption rate and may, correspondingly, repeatedly project an estimated time of arrival ("ETA") at the end of range 447 for each consumption rate until component 414 determines a stable ETA. For example, if a logging rate of 1 k log records per day is determined at the end of day 1, at which time the locator supported address space for 1000 k log records remains, then the ETA at the end of the supported log range 447 is a date 1000 days away. If a logging rate of 1 k log records per day is again determined at the end of day 2, at which time the locator supported address space for 999 k log records remains, then the estimated ETA at end of supported log range 447 is then a date 999 days away, which is the same absolute date as the first ETA. Once a stable ETA is determined, component 414 calculates a soft limit log record position 445 that is a specified position prior to end of range 447, such as two weeks, in a fashion similar to that described herein above.

Regardless of whether ETA is repeatedly determined, component 414 may repeat the determinations of consumption rate (or ETA) until a stable value is determined with a predetermined confidence level, such as 90 percent, for example, according to embodiments of the present invention, as may be indicated by statistical variation. Once a stable value is determined, soft and warning limits may be set accordingly, as described herein above. As before, the threshold could be hard-coded, statically defined during initialization or dynamically updated by the installation if necessary.

As also previously mentioned, a locator 436 may identify a log record 442 location 444 by a value based on a relative byte address or sequence number within a log record storage space 440, which component 414 increments for each transaction. This kind of locator tends to be used in a lightly threaded database, possibly with only an in-memory log. Setting aside the matter of actions that happen upon reaching a soft limit, according to embodiments of the invention as described herein, and regarding the matter of calculating a locator soft limit value by the time sampling as described herein, this calculation is needed for locators that use a physical location way (like RBA) of locating log records, but not for locators that use a time stamp way, since for the time stamp way the maximum time/date (i.e., hard limit) for the locators is known and it is possible set a predetermined date/time for the soft limit and to detect that the soft limit has been hit by determining a locator has arisen that has a time stamp that exceeds the soft limit's predetermined date/time.

The soft limit indicator setting is checked by manager 410 component 418, which is responsible for database updates. If the indicator is set, this notifies the checking component 418 that normal database updates (insert, delete, update) are disallowed and component 418 responsively does not perform the update, but instead returns a code to the requestor that indicates the failure and that indicates to the requestor not to send additional updates, since they will not be performed. For example, in DB2 the return code is a SQLCODE and SQLSTATE combination.

The action of preventing the update before the logging hard limit is reached allows the requestor to decide if it wants to abort the transaction or commit with the updates that have already been done. This may be a choice by the user who originated the transaction or it may be done automatically by the user's application 462, based on a predetermined configuration of application 462. It may also be done by a policy that is set for the database manager or for a class of transaction or for the objects being updated, for example.

Although components 418 that check the soft limit indicator do not perform new updates once indicator is set, they do perform database 420 updates for rollbacks. The time interval provided for logging between hard limit 447 and soft limit 445 is large enough to allow all active database manager 410 transactions to be completed before hard limit 447 is reached. This maintains the transactional consistency of database 420.

Space is allocated by manager 410 for each log record locator 436 of a database object 430 last update (in particular, a page of database 420, for example) and the space allocated may vary. Thus, different sets of limit values may be defined (in manners as described herein above), depending on how the logging is configured in manager 410 for different objects 430. For objects 430 configured to use larger locators 436, updates may continue for longer than permitted for objects 430 that are configured for smaller locators 436. That is, for objects 430 configured for smaller locators 436, generating new log records 442 and updates will be prevented sooner due to the smaller limit value supported by the smaller locator size. This allows for a phased transition without running the risk of corrupting database objects that can accommodate the larger format locators 436.

According to embodiments of the present invention, the space allocated is large enough to support large locators 436, even though the manager 410 may optionally be configured to use smaller locators 436. Consequently, when the manager 410 is configured to use a smaller locator 436 for this object 430, then locator 436 supports larger limit values. That is, if the space allocated for the locator is the same whether the locator is big or small, then the space allows more room for the value (and thus a larger value) if the rest of the locator is smaller.

Some existing database applications 410 will not allow the end of log range 447 to be surpassed, will not permit wrap around and will only allow very limited access to database 420 when very close to the end of log range 447 (i.e., at a value either hard coded or parameterized in some fashion). This works in conjunction with the soft limit processing as described herein for embodiments of the present invention to ensure that all database transactions are completed in one way or another when the hard limit is reached.

Referring now to FIG. 5, a method for database transaction logging is illustrated according to embodiments of the present invention. The method includes generating 510 log records by a computer system and storing them 515 in a computer readable storage area for recording changes to database objects responsive to receiving 505 transaction requests, wherein the locators for the log records are of a predetermined maximum size, so that the locator maximum size provides a maximum trackable size limit of the storage area. Also, a computer system estimates 520 an amount of time for the storing of the generated log records to fill the storage area up to the maximum trackable size limit. Further, a computer system sets 530 a soft limit to the storage area that is smaller than the maximum trackable size limit. This initialization process 520 and 530 may be repeated and may be done for a plurality of soft limits. Setting such a soft limit 530 includes setting the soft limit based on the estimated amount of time 520. Still further, a computer system detects 540 that the soft limit has been reached and responsively sends 550 a notification to a requestor. The sending 550 of the notification to a requestor, which is responsive to the detecting 540 that the soft limit has been reached, may include sending a disallowed transaction notification to the requestor further responsive to receiving a database transaction request from a requestor once the soft limit has been reached.

The method of responding to the received 505 transaction request may further include receiving 560 a response from the requestor to the disallowed transaction notification sent at 550, wherein in embodiments the response at 560 may indicate a requestor selection, such that the method includes a computer system proceeding at 565 to either abort the disallowed transaction or else commit the disallowed transaction using database transactions for which log records are already stored and without the database transaction further changing the database, according to the selection received at 560.

In embodiments of the present invention, the sending 550 of the notification to a requestor responsive to detecting 540 that the soft limit has been reached includes sending a disallowed transaction notification to the requestor further responsive to determining that the transaction request received 505 is a predetermined kind of database transaction request from a requestor.

In embodiments of the present invention, the setting 530 of the soft limit that is smaller than the maximum trackable size limit of the storage area includes setting the soft limit based on a predetermined amount of the estimated amount of time.

In embodiments of the present invention, the setting 530 of the soft limit that is smaller than the maximum trackable size limit of the storage area includes setting a plurality of the soft limits, each one of the plurality depending on at least one of a predetermined name of a database object updated by a transaction request, a predetermined importance of a database object updated by a transaction request, a predetermined application executing a transaction request, a predetermined user running the application, and a predetermined recovery condition. Thus, it should be appreciated that the soft limit or limits will allow updates to critical resources, while also preventing other updates.

Regarding FIG. 1, a pictorial representation of a network data processing system 100 is shown in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support one or more PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ series system, running the IBM® AIX® operating system or LINUX® operating system. (IBM, eServer and AIXZ are trademarks of International Business Machines Corporation, registered in many jurisdictions worldwide. Linux is a registered trademark of Linus Torvalds in the United States, other countries, or both.)

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support a plurality of PCI expansion slots or add-in connectors.

An operating system runs on processor 302 and is used to coordinate and provide control of various components within data processing system 300 in FIG. 3. The operating system may be any available operating system (commercial or open source). An object oriented programming system such as Java may run in conjunction with the operating system and provide calls to the operating system from Java programs or applications executing on data processing system 300. (Java and all Java-based trademarks and logos are trademarks or registered trademarks of Oracle and/or its affiliates.) Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and program products according to embodiments of the invention. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

The flowchart and block diagrams in the Figures illustrate the architecture, functionality, and operation of possible implementations of systems, methods and program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note that, although the invention is shown to be used in conjunction with a conventional computer system (i.e., clients 108, 110, 112 and server 104), the invention can easily be used by any handheld device (e.g., cellular telephone, PDA etc.).

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be appreciated from the above that embodiments of the present invention include detecting that the soft limit has been reached and responsively sending a notification to a transaction requestor. In another aspect, the notification is sent to a requestor responsive to detecting that the soft limit has been reached includes sending a disallowed transaction notification to the requestor further responsive to receiving a database transaction request from a requestor once the soft limit has been reached. In another aspect, a response to the disallowed transaction notification is received from the requestor, wherein the response indicates a requestor selection between aborting the disallowed transaction and committing the disallowed transaction using database transactions for which log records are already stored and without the database transaction further changing the database. In another aspect, the sending of the notification to a requestor responsive to detecting that the soft limit has been reached includes sending a disallowed transaction notification to the requestor further responsive to receiving a predetermined kind of database transaction request from a requestor once the soft limit has been reached. In another aspect, setting the soft limit that is smaller than the maximum trackable size limit of the storage area includes setting the soft limit based on a predetermined amount of time that is less than the estimated amount of time. In another aspect, setting the soft limit that is smaller than the maximum trackable size limit of the storage area includes setting a plurality of the soft limits, each one of the plurality depending on at least one of a predetermined name of a database object updated by a transaction request, a predetermined importance of a database object updated by a transaction request, a predetermined application executing a transaction request, a predetermined user running the application, and a predetermined recovery condition.

In additional embodiments a database administrator or system administrator may set limits as described herein above. Multiple soft limits can be set as well. Further, it should be understood that there may be different limits for different database objects depending on importance or similar criteria. Similarly, there may be different limits for different types of transactions, such as, for example, after a first soft limit is encountered updates are still allowed for account transfer transactions but are not allowed for change-of-address transactions, etc.

What is claimed is:

1. A method for database transaction logging, comprising:
generating log records by a computer system and storing them in a computer readable log record storage area for storing log records, wherein the log records record what changes in respective database objects responsive to respective received transaction requests, and wherein locators for the log records indicate locations of the log records in the log record storage area and each log record is of a predetermined maximum size that provides a maximum trackable size limit of the log record storage area where if there is no more space for log records then database transactions must stop;
estimating, by a computer system, an amount of time for the storing of the generated log records to fill the log record storage area up to the maximum trackable size limit, where the estimating includes determining how much log record space was filled during a sampling time interval when transactions occurred for which log records were generated and were stored in the log record storage area, thereby taking up more space in the log record storage area;
setting, by a computer system, a soft limit to the log record storage area that is smaller than the maximum trackable size limit, including setting the soft limit based on the estimated amount of time,
determining the log records have filled the log record storage area up to the soft limit and at least one database transaction request has been received after the log records have filled the log record storage area up to the soft limit;
determining the at least one database transaction request is for a certain kind of database transaction; and
blocking at least execution completion of the at least one database transaction for the database transaction request responsive to the determining the at least one database transaction request is for the certain kind of database transaction and responsive to the determining the log records have filled the log record storage area up to the soft limit and the at least one database transaction request has been received after the log records have filled the log record storage area up to the soft limit log records.

2. The method of claim 1, comprising:
detecting that the soft limit has been reached and responsively sending a notification to a transaction requestor.

3. The method of claim 2, wherein sending the notification to a requestor responsive to detecting that the soft limit has been reached includes sending a disallowed transaction notification to the requestor further responsive to receiving a database transaction request from a requestor once the soft limit has been reached.

4. The method of claim 3, comprising:
receiving a response to the disallowed transaction notification from the requestor, wherein the response indicates a requestor selection between aborting the disallowed transaction and committing the disallowed transaction using database transactions for which log records are already stored and without the database transaction further changing the database.

5. The method of claim 2, wherein sending the notification to a requestor responsive to detecting that the soft limit has been reached includes sending a disallowed transaction notification to the requestor further responsive to receiving a predetermined kind of database transaction request from a requestor once the soft limit has been reached.

6. The method of claim 3, wherein setting the soft limit that is smaller than the maximum trackable size limit of the log record storage area includes setting a plurality of the soft limits, each one of the plurality depending on at least one of a predetermined name of a database object updated by a transaction request, a predetermined importance of a database object updated by a transaction request, a predetermined application executing a transaction request, a predetermined user running the application, and a predetermined recovery condition.

7. A computer program product for database transaction logging, the computer program product including a non-transitory computer readable storage medium having instructions stored thereon for execution by a computer system, wherein the instructions, when executed by the computer system, cause the computer system to implement a method comprising:
generating log records by a computer system and storing them in a computer readable log record storage area for storing log records, wherein the log records record what changes in respective database objects responsive to respective received transaction requests, and wherein locators for the log records indicate locations of the log records in the log record storage area and each log record is of a predetermined maximum size that provides a maximum trackable size limit of the log record storage area where if there is no more space for log records then database transactions must stop;
estimating, by a computer system, an amount of time for the storing of the generated log records to fill the log record storage area up to the maximum trackable size limit, where the estimating includes determining how much log record space was filled during a sampling time interval when transactions occurred for which log records were generated and were stored in the log record storage area, thereby taking up more space in the log record storage area;

setting, by a computer system, a soft limit to the log record storage area that is smaller than the maximum trackable size limit, including setting the soft limit based on the estimated amount of time, determining the log records have filled the log record storage area up to the soft limit and at least one database transaction request has been received after the log records have filled the log record storage area up to the soft limit;

determining the at least one database transaction request is for a certain kind of database transaction; and blocking at least execution completion of the at least one database transaction for the database transaction request responsive to the determining the at least one database transaction request is for the certain kind of database transaction and responsive to the determining the log records have filled the log record storage area up to the soft limit and the at least one database transaction request has been received after the log records have filled the log record storage area up to the soft limit log records.

8. The computer program product of claim 7, wherein the instructions, when executed by the computer system, cause the computer system to implement a method comprising:

detecting that the soft limit has been reached and responsively sending a notification to a requestor.

9. The computer program product of claim 8, wherein sending the notification to a requestor responsive to detecting that the soft limit has been reached includes sending a disallowed transaction notification to the requestor further responsive to receiving a database transaction request from a requestor once the soft limit has been reached.

10. The computer program product of claim 9, wherein the instructions, when executed by the computer system, cause the computer system to implement a method comprising:

receiving a response to the disallowed transaction notification from the requestor, wherein the response indicates a requestor selection between aborting the disallowed transaction and committing the disallowed transaction using database transactions for which log records are already stored and without the database transaction further changing the database.

11. The computer program product of claim 8, wherein sending the notification to a requestor responsive to detecting that the soft limit has been reached includes sending a disallowed transaction notification to the requestor further responsive to receiving a predetermined kind of database transaction request from a requestor once the soft limit has been reached.

12. The computer program product of claim 9, wherein setting the soft limit that is smaller than the maximum trackable size limit of the log record storage area includes setting a plurality of the soft limits, each one of the plurality depending on at least one of a predetermined name of a database object updated by a transaction request, a predetermined importance of a database object updated by a transaction request, a predetermined application executing a transaction request, a predetermined user running the application, and a predetermined recovery condition.

13. A system for database transaction logging, a comprising:

a processor; and a computer readable storage medium connected to the processor, wherein the computer readable storage medium has stored thereon a program for controlling the processor, and wherein the processor is operative with the program to execute the program for:

generating log records by a computer system and storing them in a computer readable log record storage area for storing log records, wherein the log records record what changes in respective database objects responsive to respective received transaction requests, and wherein locators for the log records indicate locations of the log records in the log record storage area and each log record is of a predetermined maximum size that provides a maximum trackable size limit of the log record storage area where if there is no more space for log records then database transactions must stop;

estimating, by a computer system, an amount of time for the storing of the generated log records to fill the log record storage area up to the maximum trackable size limit, where the estimating includes determining how much log record space was filled during a sampling time interval when transactions occurred for which log records were generated and were stored in the log record storage area, thereby taking up more space in the log record storage area;

setting, by a computer system, a soft limit to the log record storage area that is smaller than the maximum trackable size limit, including setting the soft limit based on the estimated amount of time, determining the log records have filled the log record storage area up to the soft limit and at least one database transaction request has been received after the log records have filled the log record storage area up to the soft limit;

determining the at least one database transaction request is for a certain kind of database transaction; and blocking at least execution completion of the at least one database transaction for the database transaction request responsive to the determining the at least one database transaction request is for the certain kind of database transaction and responsive to the determining the log records have filled the log record storage area up to the soft limit and the at least one database transaction request has been received after the log records have filled the log record storage area up to the soft limit log records.

14. The system of claim 12, wherein the computer readable storage medium has stored thereon a program for controlling the processor, and wherein the processor is operative with the program to execute the program for:

detecting that the soft limit has been reached and responsively sending a notification to a requestor.

15. The system of claim 14, wherein sending the notification to a requestor responsive to detecting that the soft limit has been reached includes sending a disallowed transaction notification to the requestor further responsive to receiving a database transaction request from a requestor once the soft limit has been reached.

16. The system of claim 15, wherein the computer readable storage medium has stored thereon a program for controlling the processor, and wherein the processor is operative with the program to execute the program for:

receiving a response to the disallowed transaction notification from the requestor, wherein the response indicates a requestor selection between aborting the disallowed transaction and committing the disallowed transaction using database transactions for which log records are already stored and without the database transaction further changing the database.

17. The system of claim 14, wherein sending the notification to a requestor responsive to detecting that the soft limit has been reached includes sending a disallowed transaction notification to the requestor further responsive to receiving a predetermined kind of database transaction request from a requestor once the soft limit has been reached.

18. The system of claim 15, wherein setting the soft limit that is smaller than the maximum trackable size limit of the log record storage area includes setting a plurality of the soft limits, each one of the plurality depending on at least one of a predetermined name of a database object updated by a transaction request, a predetermined importance of a database object updated by a transaction request, a predetermined application executing a transaction request, a predetermined user running the application, and a predetermined recovery condition.

\* \* \* \* \*